(12) United States Patent
Yamaguchi et al.

(10) Patent No.: US 9,944,785 B2
(45) Date of Patent: Apr. 17, 2018

(54) RUBBER MODIFIED STYRENE RESIN, AND SHEET, FOOD CONTAINER, AND FOOD CONTAINER LID MEMBER PRODUCED USING SAME

(71) Applicant: Toyo Styrene Co., Ltd., Minato-ku, Tokyo (JP)

(72) Inventors: Hiroo Yamaguchi, Ichihara (JP); Masayoshi Ando, Ichihara (JP)

(73) Assignee: Toyo Styrene Co., Ltd., Tokyo (JP)

( * ) Notice: Subject to any disclaimer, the term of this patent is extended or adjusted under 35 U.S.C. 154(b) by 0 days.

(21) Appl. No.: 15/036,541

(22) PCT Filed: Jul. 4, 2014

(86) PCT No.: PCT/JP2014/067985
§ 371 (c)(1),
(2) Date: Jul. 14, 2016

(87) PCT Pub. No.: WO2015/072176
PCT Pub. Date: May 21, 2015

(65) Prior Publication Data
US 2016/0326361 A1   Nov. 10, 2016

(30) Foreign Application Priority Data

Nov. 13, 2013 (JP) ................. 2013-234786

(51) Int. Cl.
| | | |
|---|---|---|
| C08L 51/04 | (2006.01) | |
| B65D 1/00 | (2006.01) | |
| B65D 43/02 | (2006.01) | |
| C08J 5/18 | (2006.01) | |
| C08F 279/02 | (2006.01) | |
| B65D 65/38 | (2006.01) | |

(52) U.S. Cl.
CPC ........... *C08L 51/04* (2013.01); *B65D 1/00* (2013.01); *B65D 43/02* (2013.01); *B65D 65/38* (2013.01); *C08F 279/02* (2013.01); *C08J 5/18* (2013.01); *C08J 2351/00* (2013.01); *C08J 2351/04* (2013.01); *C08L 2203/16* (2013.01); *C08L 2203/30* (2013.01); *C08L 2205/06* (2013.01); *C08L 2207/324* (2013.01)

(58) Field of Classification Search
CPC ........................................ C08L 51/04
See application file for complete search history.

(56) References Cited

U.S. PATENT DOCUMENTS

| | | | |
|---|---|---|---|
| 6,232,358 B1 | 5/2001 | Haraguchi | |
| 6,657,010 B2 * | 12/2003 | Kawano | C08F 279/02 525/217 |
| 2002/0077425 A1 | 6/2002 | Kawano | |

FOREIGN PATENT DOCUMENTS

| | | |
|---|---|---|
| JP | 04-227914 A | 8/1992 |
| JP | 06-157687 A | 6/1994 |
| JP | 08-504450 A | 5/1996 |
| JP | 11-147970 A | 6/1999 |
| JP | 2000-053791 A | 2/2000 |
| JP | 2001-098037 A | 4/2001 |
| JP | 2002-275210 A | 9/2002 |
| JP | 2010-037455 A | 2/2010 |
| JP | 2010037455 A * | 2/2010 |
| JP | 2011-162639 A | 8/2011 |

OTHER PUBLICATIONS

English machine translation of Yamaguchi et al. (JP 2010037455); translated Jan. 23, 2017.*
International Search Report dated Oct. 7, 2014, issued in corresponding International Application No. PCT/JP2014/067985, filed Jul. 4, 2014, 4 pages.
Japanese Office Action dated Apr. 19, 2016, issued in corresponding Application No. JP2015-547654, 8 pages.
Written Explanation for Accelerated Examination, dated Jan. 5, 2016, issued in corresponding Application No. JP2015-547654, 4 pages.

* cited by examiner

*Primary Examiner* — Michael Pepitone
(74) *Attorney, Agent, or Firm* — Christensen O'Connor Johnson Kindness PLLC

(57) ABSTRACT

A rubber modified styrene-based resin is provided that is excellent in oil resistance, folding endurance, and tear strength and that is preferably used for a food container and a food container lid member not cracking by repeated fitting. According to the present invention, a rubber modified styrene-based resin is provided that contains rubbery dispersed particles, having a volume median particle diameter from 4.0 to 10 μm and a gel component from 22.0 to 35.0 mass %; a matrix phase having a weight average molecular weight (Mw) from 150 thousand to 300 thousand; and a methanol soluble component from 1.5% to 4.0%.

12 Claims, 1 Drawing Sheet

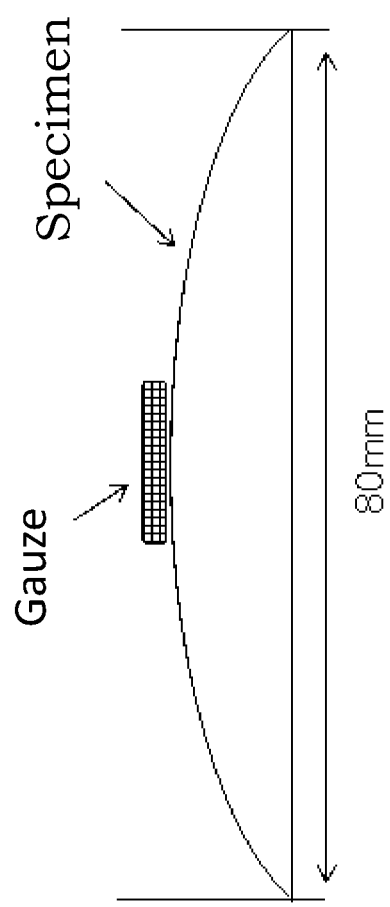

RUBBER MODIFIED STYRENE RESIN, AND SHEET, FOOD CONTAINER, AND FOOD CONTAINER LID MEMBER PRODUCED USING SAME

CROSS-REFERENCE TO RELATED APPLICATIONS

This application is a National Stage of PCT/JP2014/067985, filed Jul. 4, 2014, which claims the benefit of Japanese Patent Application No. 2013-234786, filed Nov. 13, 2013, each of which is hereby incorporated by reference in its entirety.

TECHNICAL FIELD

The present invention is related to a rubber modified styrene-based resin that is excellent in oil resistance, folding endurance, and tear strength and that is used preferably as a food container and a food container lid member particularly making direct contact with oil and milk and being repeatedly fit.

BACKGROUND ART

Rubber modified styrene-based resins represented by high impact polystyrene (HIPS) are excellent in impact resistance, moldability, and dimensional stability, and thus such resin is widely used as a food packaging material, such as deli containers, lunch box containers, various trays, beverage containers, and food container lid members.

However, as well known, such rubber modified styrene-based resin is not resistant to environmental stress cracking by oil and chemicals and thus may crack in a short time due to the contact with fat and oil contained in foods depending on the environment of use. In particular, when the rubber modified styrene-based resin is used as a food container lid member, such as a coffee cup lid, there has been a problem of accelerating cracking in the container by the stress for repeated fitting.

As a method of improving the oil resistance of such rubber modified styrene-based resin, there is a method in which a polyolefin-based resin film is laminated on a rubber modified styrene-based resin sheet. This method, however, has problems of not only a great increase in processing costs but also non-recyclability of trimmed scrap produced when a food container is molded by thermoforming, such as pressure forming and vacuum forming, them.

As other methods of improving oil resistance, PLTs 1 through 3 disclose methods in which a dispersed particle diameter of a rubber modified styrene-based resin is increased. Further, in order to improve fitting properties of a food container, PLT 4 discloses a method in which a dispersed particle diameter, a gel component, and a graft ratio of a rubber modified styrene-based resin are defined in specific ranges.

These methods, however, are not concerned with folding endurance and tear strength when a rubber modified styrene-based resin sheet is used as a food container and thus are insufficient to cope with cracking of the food container lid member for repeated fitting.

As a method of improving folding endurance and tear strength of a rubber modified styrene-based resin sheet, there is a method in which a styrene-butadiene copolymer is added. The copolymer has to be added in a large amount to give oil resistance, and as a result, rigidity and fitting properties as a food container and a food container lid member are reduced. In addition, there has been a problem of deteriorating the appearance of a sheet due to foreign gel objects by a crosslinking reaction of the styrene-butadiene copolymer during molding process.

CITATION LIST

Patent Literature

PLT 1: JP 4-227914A
PLT 2: JP 8-504450A
PLT 3: JP 2002-275210A
PLT 4: JP 2010-37455A

SUMMARY OF INVENTION

Technical Problem

The present invention has been made in view of such circumstances and is to provide a rubber modified styrene-based resin that is excellent in oil resistance, folding endurance, and tear strength and that is capable of providing a food container and a food container lid member not cracking by repeated fitting.

Solution to Problem

As a result of keen examination to achieve the above problems, the present inventors have found that the above problems are achieved by, in a rubber modified styrene-based resin, defining a volume median particle diameter and a gel component of rubbery dispersed particles, a matrix molecular weight, and a methanol soluble component in specific ranges and thus have come to complete the present invention.

That is, the present invention is as described as (1) through (7) below.

(1) A rubber modified styrene-based resin including: rubbery dispersed particles, having a volume median particle diameter from 4.0 to 10 μm and a gel component from 22.0 to 35.0 mass %; a matrix phase having a weight average molecular weight (Mw) from 150 thousand to 300 thousand; and a methanol soluble component from 1.5% to 4.0%.

(2) A method of producing the rubber modified styrene-based resin according to (1) above including graft polymerizing a styrene-based monomer in presence of high-cis polybutadiene having a 1,4-cis structure of 90 mol % or more and having a 1,2-vinyl structure of 4 mol % or less and/or high-cis high-vinyl polybutadiene having a 1,4-cis structure from 65 to 95 mol % and having a 1,2-vinyl structure from 30 to 4 mol %.

(3) A sheet including the rubber modified styrene-based resin according to (1) above.

(4) The sheet according to (3) above, wherein a sum of heat shrinkage rates at 100° C. for 30 minutes in an extrusion direction of the sheet and a direction vertical thereto is 10% or less.

(5) The sheet according to (3) or (4), wherein a degree of gloss of at least one surface of the sheet at an angle of incidence of 60 degrees is 70% or less.

(6) A food container including the sheet according to any one of (3) through (5) above, the container obtained by thermoforming the sheet.

(7) A food container lid member including the sheet according to any one of (3) through (5) above, the container obtained by thermoforming the sheet.

Advantageous Effects of Invention

Since the rubber modified styrene-based resin of the present invention is excellent in oil resistance, folding endurance, and tear strength, it is preferably used as a food container and a food container lid member that are fit repeatedly.

BRIEF DESCRIPTION OF DRAWINGS

FIG. 1 is a schematic view of a constant strain jig used for an oil resistance test of the present invention.

DESCRIPTION OF EMBODIMENTS

The present invention is described in detail below.

A rubber modified styrene-based resin of the present invention is obtained by graft polymerization of a styrene-based monomer in the presence of polybutadiene. It is possible to produce it by a known method of polymerization, for example, a bulk polymerization method, a two step bulk-suspension polymerization method, a solution polymerization method, and the like. The styrene-based monomer includes a single compound or a mixture of styrene, α-methylstyrene, o-methylstyrene, p-methylstyrene, and the like. It is particularly preferably styrene. It is also possible to copolymerize a monomer that is copolymerizable with such styrene-based monomer, such as acrylonitrile, methacrylate ester, methacrylic acid, and acrylate ester, for example, as long as the effects of the present invention are not impaired.

Polybutadiene used for the rubber modified styrene-based resin of the present invention may include any of or a mixture of high-cis polybutadiene having a 1,4-cis structure of 90 mol % or more and having a 1,2-vinyl structure of 4 mol % or less, high-cis high-vinyl polybutadiene having a 1,4-cis structure from 65 to 95 mol % and having a 1,2-vinyl structure from 30 to 4 mol %, low-cis polybutadiene having a 1,4-cis structure from 15 to 40 mol %, and a styrene-butadiene copolymer. It is particularly preferably high-cis polybutadiene and/or high-cis high-vinyl polybutadiene. When high-cis polybutadiene and/or high-cis high-vinyl polybutadiene is used, a product having physical properties excellent in oil resistance, rigidity, and impact resistance.

In the rubber modified styrene-based resin the present invention, the rubbery dispersed particles have a volume median particle diameter from 4.0 to 10 μm and preferably from 4.5 to 8.0 μm. When the volume median particle diameter is less than 4.0 μm, oil resistance, folding endurance, and tear strength of the resin thus obtained are reduced. When the particle diameter is more than 10 μm, rigidity of the resin thus obtained is severely reduced. A method of controlling the particle diameter may include a method in which the stirring speed in the phase transition region of the rubber particles is controlled in the polymerization procedure, a method in which the amount of chain transfer agent in the liquid material is controlled, and the like. The rubbery dispersed particles have a volume median particle diameter defined in the present invention as a 50 volume % particle diameter of a particle diameter distribution curve on a volumetric basis obtained by measurement in a Coulter multisizer method (Multisizer II manufactured by Beckman Coulter, Inc.: orifice diameter of aperture tube of 30 μm) in which 0.05 g of the rubber modified styrene-based resin is dissolved in 20 milliliters of an electrolyte (3% tetra-n-butylammonium/97% dimethylformamide solution).

In the rubber modified styrene-based resin used in the present invention, the rubbery dispersed particles have a gel component from 22.0 to 35.0 mass % and preferably from 23.0 to 32.0 mass %. When the gel component is less than 22.0 mass %, oil resistance, folding endurance, and tear strength of the resin thus obtained are reduced. When the gel component is more than 35.0 mass %, rigidity of the resin thus obtained is reduced. A method of controlling the gel component may include, in addition to a method in which the rubber content is controlled in the polymerization procedure and a method in which the amount of initiator is controlled, a method in which the gel component is controlled by being blended with a homopolymer of styrene after polymerization and the like. The gel component is a ratio of the rubbery dispersed particles in the rubber modified styrene-based resin. It is possible to obtain the gel component as follows by precise weighing (W) of the rubber modified styrene-based resin in mass of 1.00 g, adding 35 milliliters of a 50% methylethylketone 50% acetone mixed solution for dissolution, centrifuging the solution with a centrifugal separator (H-2000B manufactured by Kokusan Co., Ltd. (rotor :H)) at 10000 rpm for 30 minutes to sediment insolubles, removing the supernatant liquid by decantation to obtain the insolubles, predrying in a safety oven at 90° C. for two hours, and further vacuum drying in a vacuum drier at 120° C. for one hour and cooling in a desiccator for 20 minutes, followed by measuring mass G of the dried insolubles.

Gel Component(Amount of Rubbery Dispersed Particles)(mass %)=$(G/W) \times 100$

In the rubber modified styrene-based resin used in the present invention, the graft ratio of the rubbery dispersed particles is preferably from 1.00 to 3.00 and even more preferably from 1.00 to 2.50. When the graft ratio is less than 1.00, a greater rubber component is required to keep oil resistance of the resin thus obtained. When the graft ratio is more than 3.00, rigidity and strength of the resin thus obtained are reduced. A method of controlling the graft ratio includes a method in which the amount of initiator is reduced in the polymerization procedure, whereas the graft ratio changes depending on the form of reactor and the type of rubber. It is possible to obtain the graft ratio of the rubbery dispersed particles in the rubber modified styrene-based resin as follows from the gel component (mass %) in the rubber modified styrene-based resin and the rubber component (mass %) in the rubber modified styrene-based resin.

Graft Ratio=(Gel Component−Rubber Component)/ Rubber Component

It is possible to obtain the rubber component in the rubber modified styrene-based resin from the amount of added iodine monochloride obtained by dissolving the rubber modified styrene-based resin in chloroform, adding a certain amount of iodine monochloride/carbon tetrachloride solution, leaving in the dark for approximately one hour, followed by adding a potassium iodide solution, and titrating excessive iodine monochloride with a 0.1 N aqueous sodium sulfate/ethanol solution for addition.

In the rubber modified styrene-based resin used in the present invention, the rubbery dispersed particles preferably have a degree of swelling SI from 10.0 to 20.0 and even more preferably from 12.0 to 17.0. When the degree of swelling SI is less than 12.0, strength of the resin thus obtained is reduced. When the degree of swelling SI is more than 20.0, strength and rigidity of the resin are reduced. A method of controlling the degree of swelling SI includes a method in which temperature conditions in the devolatilization procedure are controlled. It is possible to obtain the degree of swelling SI of the rubbery dispersed particles in the rubber modified styrene-based resin as follows by precisely weighing 1.00 g of the rubber modified styrene-based resin, adding 30 milliliters of toluene for dissolution, centrifuging the solution with a centrifugal separator (H-2000B manufactured by Kokusan Co., Ltd. (rotor :H)) at 10000 rpm for 30 minutes to sediment insolubles, removing the supernatant liquid by decantation, measuring mass S of the insolubles swollen by toluene, subsequently predrying the insolubles swollen by toluene in a safety oven at 90° C. for two hours, further vacuum drying in a vacuum drier at 120° C. for one hour, and drying in a desiccator for 20 minutes, followed by measuring dried mass D of the insolubles.

Degree of Swelling $SI=S/D$

In the rubber modified styrene-based resin of the present invention, the methanol soluble component is from 1.5 to 4.0 mass % and preferably from 2.0 to 3.0 mass %. When the methanol soluble component is less than 1.5 mass %, oil resistance, folding endurance, and tear strength are reduced. When the methanol soluble component is more than 4.0 mass %, oil resistance, folding endurance, and tear strength are also reduced.

The methanol soluble component here means a component, in the rubber modified styrene-based resin, soluble in methanol. For example, the methanol soluble component contains, in addition to a styrene oligomer (styrene dimer, styrene trimer) as a by-product in the polymerization procedure and the devolatilization procedure of the rubber modified styrene-based resin, various additives, such as liquid paraffin and silicone oil, the residual styrene monomer, and a low molecular weight component, such as the polymerization solvent. A method of controlling the methanol soluble component may include a method in which the amount of styrene oligomer (styrene dimer, styrene trimer) produced as a by-product in the polymerization procedure is controlled by the type and amount of the initiator, a method in which the methanol soluble component is controlled by the amount of added liquid paraffin and silicone oil, and the like. It is possible to obtain the methanol soluble component as follows by precisely weighing (P) 1.00 g of rubber modified styrene-based resin, adding 40 milliliters of methylethylketone for dissolution, rapidly adding 400 milliliters of methanol, precipitating methanol insolubles (resin component) for precipitation, leaving them for approximately ten minutes, followed by gradual filtering with a glass filter to separate the methanol soluble component, vacuum drying in a vacuum drier at 120° C. for two hours, and after that, leaving it to cool in a desiccator for five minutes, and measuring mass N of the dried methanol insolubles.

Methanol Soluble Component(mass %)=$(P-N)/P \times 100$

In the rubber modified styrene-based resin of the present invention, the matrix phase has a weight average molecular weight (Mw) from 150 thousand to 300 thousand and preferably from 160 thousand to 250 thousand. When Mw is less than 150 thousand, oil resistance, folding endurance, and tear strength are reduced. When Mw is more than 300 thousand, viscosity of the resin increases too much and the productivity decreases. While there is a method in which the gel component is reduced to control the viscosity, the method results in reduction of oil resistance, folding endurance, and tear strength.

The matrix phase here means a polymer layer except the rubbery dispersed particles in the rubber modified styrene-based resin. A method of controlling Mw in the matrix phase may include, in addition to a method in which Mw is controlled by the reaction temperature, the residence time, the type and the amount of added polymerization initiator, and the type and the amount of solvent to be used in the polymerization procedure of the rubber modified styrene-based resin, a method in which Mw is controlled by blending with a homopolymer of styrene after polymerization and the like. The weight average molecular weight (Mw) in the matrix phase was measured in the following conditions using gel permeation chromatography (GPC) by use of a dried sample obtained by rapidly adding 250 milliliters of methanol to the supernatant liquid from which the insolubles after centrifugation are removed in the measurement of the gel component to precipitate the methanol insolubles (resin component) for precipitation, still leaving it for approximately ten minutes, followed by gradually filtering with a glass filter to separate the methanol soluble component, vacuum drying in a vacuum drier at 120° C. for two hours, followed by leaving it to cool in a desiccator for five minutes for drying.

GPC apparatus model: Shodex GPC-101 manufactured by Showa Denko K.K.

Column: PL gel 10 µm MIXED-B, 300×7.5 mm manufactured by Polymer Laboratories Ltd.

Mobile Phase: tetrahydrofuran 1.0 ml/min

Sample Concentration: 0.2 mass %

Temperature: 40° C. in oven, 35° C. in inlet port, 35° C. in detector

Detector: differential refractometer

By an elution curve of monodisperse polystyrene, a molecular weight at each elution time is calculated as a molecular weight in terms of polystyrene.

To the rubber modified styrene-based resin of the present invention, one or more types of a rubber modified styrene-based resin other than the rubber modified styrene-based resin of the present invention, a styrene-based resin that is not rubber modified, and a rubber reinforcing agent may be blended as needed as long as the effects of the present invention are not impaired.

Specific examples of rubber reinforcing agent may include: natural rubber; polybutadiene; polyisoprene; polyisobutylene; polychloroprene; polysulfide rubber; Thiokol rubber; acrylic rubber; urethane rubber; silicone rubber; epichlorohydrin rubber; styrene-based rubber, such as a styrene-butadiene block copolymer, a styrene-butadiene-styrene copolymer, a styrene-isoprene block copolymer, a styrene-isoprene-styrene block copolymer, a hydrogenated styrene-butadiene block copolymer, a hydrogenated styrene-butadiene-styrene block copolymer, a hydrogenated styrene-isoprene block copolymer, and a hydrogenated styrene-isoprene-styrene block copolymer; olefin-based rubber, such as ethylene propylene rubber, ethylene propylene diene rubber, and a linear low density polyethylene-based elastomer; butadiene-acrylonitrile-styrene-core shell rubber; methyl methacrylate-butadiene-styrene-core shell rubber; methyl methacrylate-butyl acrylate-styrene-core shell rubber; octyl acrylate-butadiene-styrene-core shell rubber; alkyl acrylate-butadiene-acrylonitrile-styrene-core shell rubber; and high impact polystyrene, and they may be used singly or two or more types in combination.

To the rubber modified styrene-based resin of the present invention, as additives, antioxidants such as phosphorus-based ones, phenol-based ones, and amine-based ones; lubricants, such as higher fatty acid like stearic acid, zinc stearate, calcium stearate, and magnesium stearate and salts thereof and ethylenebisstearylamide; inorganic fillers, such as talc and calcium carbonate; ultraviolet absorbers; antistatic agents; colorants; pigments; deodorants; and the like may be added as needed.

To the rubber modified styrene-based resin of the present invention, a recycled material, such as die cut scrap called as a skeleton produced during secondary molding of the rubber modified styrene-based resin sheet and its recycled pellets, may be blended as long as the effects of the present invention are not impaired. In this case, the properties after mixing the recycled material are controlled to fall within the ranges of the rubber modified styrene-based resin of the present invention.

The rubber modified styrene-based resin of the present invention has a melt mass flow rate (MFR) measured at 190° C. under a load of 2160 g preferably from 1.0 to 5.0 g/10 min. and even more preferably from 1.5 to 4.0 g/10 min. When the MFR is less than 1.0 g/10 min., productivity during sheet formation is reduced. When the MFR is more than 5.0 g/10 min., oil resistance, folding endurance, and tear strength are reduced.

The rubber modified styrene-based resin of the present invention preferably has Charpy impact strength of 16 kJ/m$^2$ or more and even more preferably 18 kJ/m$^2$ or more. When the Charpy impact strength is less than 16 kJ/m$^2$, folding endurance and tear strength are reduced.

It is possible to form various sheets from the rubber modified styrene-based resin of the present invention using known sheet production methods. Specific examples of the sheet production method may include a method in which a molten resin is extruded from a T die, a calender molding method, an inflation molding method, and the like. From the perspective of productivity and film thickness accuracy, it is preferred to use a T die. The sheet may be a monolayer or a multilayer sheet with the rubber modified styrene-based resin of the present invention only on the surface in contact with oil out of the outermost layers. A method of producing the multilayer sheet may include a coextrusion method using a feed block die or a multi-manifold die and a method in which a surface layer is prepared singly in advance to be heat laminated with a substrate sheet. Although the sheet thickness is not particularly restricted, it is preferably 0.2 mm or more from the perspective of strength and rigidity of a molded article.

A sum of heat shrinkage rates in an extrusion direction of the sheet of the present invention and a direction vertical thereto at 100° C. for 30 minutes is preferably 10% or less and even more preferably 5% or less. When the sum of heat shrinkage rates in the sheet extrusion direction and the direction vertical thereto at 100° C. for 30 minutes is more than 10%, it is not desired because folding endurance and tear strength of the sheet are reduced. The heat shrinkage rate represents a degree of orientation of the sheet. A better sheet is obtained by applying orientation as less as possible. The heat shrinkage rate (degree of orientation) may be controlled by the sheet extrusion temperature, the drawdown ratio (die lip thickness/sheet thickness), the temperature of a casting roll or a touch roll, and the like.

A degree of gloss of at least one surface of the sheet of the present invention at an angle of incidence of 60 degrees is preferably 70% or less and even more preferably 50% or less. When the degrees of gloss of both surfaces of the sheet are more than 70%, it is not desired because folding endurance and tear strength of the sheet deteriorate. The degree of gloss may be controlled by the sheet extrusion temperature, the temperature of a casting roll or a touch roll, the pressing pressure of a touch roll, and the like.

The sheet of the present invention preferably has tear strength of 3 N/mm or more and even more preferably 4 N/mm or more. When the tear strength is less than 3 N/mm, a container obtained by thermoforming the sheet often cracks by repeated fitting.

It is possible to mold the sheet of the present invention into a food packaging container in various shapes such as food containers, like a deli container, a lunch box container, a tray, a beverage container, a dessert container, a frozen dessert container, a yogurt container, and a single use cream container, and food container lid members like a coffee cup lid member by a known molding method, such as a vacuum forming method, a pressure forming method, a matched molding method, a reverse drawing method, an air stripping method, a ridge forming method, a plug and ridge forming method, and a heating platen forming method.

Since containers obtained by molding the sheet of the present invention less crack even when repeatedly fit and less crack by environmental stress when making contact with cooking oil, it is possible to use them widely as food containers and food container lid members.

EXAMPLES

The present invention is specifically described below with reference to Examples. It should be noted, though, that the present invention is not limited to Examples below.

Rubber modified styrene-based resins used in Examples were produced as follows.

(1) Production of Rubber Modified Styrene-Based Resin HIPS-1

The polymerization procedure was composed of first through fourth reactors below by connecting them in series.

First Reactor: complete mixing reactor with a volume of 25 L having stirring blades Second Reactor: plug flow reactor with a volume of 39 L having stirring blades Third Reactor: plug flow reactor with a volume of 50 L having stirring blades Fourth Reactor: plug flow reactor with a volume of 50 L having a static mixer Conditions of each reactor were as follows.

First Reactor: [Rate of Stirring] 100 rpm, [Reaction Temperature] 125° C.,

Second Reactor: [Rate of Stirring] 60 rpm, [Reaction Temperature] controlled to give a temperature gradient from 128 to 130° C. in the flow direction, Third Reactor: [Rate of Stirring] 30 rpm, [Reaction Temperature] 128° C., Fourth Reactor: [Reaction Temperature] controlled to give a temperature gradient from 140 to 168° C.

The following raw materials were used.

The liquid material had 0.020 mass % of t-dodecyl mercaptan added to a solution in which 75.5 mass % of a styrene monomer, 16.2 mass % of ethylbenzene, and 8.3 mass % of high-cis polybutadiene ("BR-15HB" produced by Ube Industries, Ltd.) were dissolved.

Firstly, the liquid material was continuously fed to the first reactor at a feeding rate of 20 L/hr for polymerization, followed by being continuously charged to the second reactor for polymerization. At the outlet of the first reactor, the rubbery polymer was not yet in the form of dispersed particles (phase inversion). At the outlet of the second reactor, the polymer was completed to be in the form of dispersed particles, and the polymerization conversion rate at this point was 27%. Subsequently, the polymerization liquid from the outlet of the second reactor was continuously charged to the third reactor, and the polymerization conversion rate at this point was 45%. The polymerization further proceeded in the fourth reactor until the polymerization conversion rate reaches 82%. The polymerization liquid thus obtained was introduced to vacuum devolatilization chambers with a preheater composed of two chambers in series to separate unreacted styrene and ethylbenzene, followed by being extruded in the form of strand for cooling and then cut into pellets. In the first devolatilization chamber, the resin temperature was set at 210° C. and the pressure in the vacuum devolatilization chamber was at 53 kPa. In the second devolatilization chamber, the resin temperature was set at 220° C. and the pressure in the vacuum devolatilization chamber was at 2.7 kPa. Then, 1.5 mass % of liquid paraffin was added to 98.5 mass % of the resin obtained by the polymerization and they were blended uniformly using a twin screw extruder. The properties of the rubber modified styrene-based resin HIPS-1 thus obtained are shown in Table 1.

(2) Production of Rubber Modified Styrene-Based Resin HIPS-2

A rubber modified styrene-based resin was produced in the same manner as the method of producing HIPS-1 other than using the following liquid material and adding 1.4 mass % of liquid paraffin to 98.6 mass % of the resin obtained by the polymerization. The properties are shown in Table 1.
<Liquid Material>
The liquid material had 0.020 mass % of t-dodecyl mercaptan added to a solution in which 78.6 mass % of a styrene monomer, 13.9 mass % of ethylbenzene, and 7.5 mass % of high-cis polybutadiene ("BR-15HB" produced by Ube Industries, Ltd.) were dissolved.

(3) Production of Rubber Modified Styrene-Based Resin HIPS-3

A rubber modified styrene-based resin was produced in the same manner as the method of producing HIPS-1 other than using the following liquid material, changing the temperature condition (reaction temperature) in the fourth reactor as follows, and adding 1.9 mass % of liquid paraffin to 98.1 mass % of the resin obtained by the polymerization. The properties are shown in Table 1.
<Liquid Material>
The liquid material had 0.020 mass % of t-dodecyl mercaptan added to a solution in which 79.9 mass % of a styrene monomer, 14.1 mass % of ethylbenzene, and 6.0 mass % of high-cis polybutadiene ("BR-15HB" produced by Ube Industries, Ltd.) were dissolved.
<Condition>
Fourth reactor: [Reaction Temperature] controlled to give a temperature gradient from 130 to 148° C. in the flow direction.

(4) Production of Rubber Modified Styrene-Based Resin HIPS-4

A rubber modified styrene-based resin was produced in the same manner as the method of producing HIPS-1 other than using the following liquid material, changing the temperature conditions (rate of stirring and/or reaction temperature) in the second reactor and the fourth reactor as follows, and adding 1.4 mass % of liquid paraffin to 98.6 mass % of the resin obtained by the polymerization. The properties are shown in Table 1.
<Liquid Material>
The liquid material had 0.005 mass % of t-dodecyl mercaptan added to a solution in which 79.5 mass % of a styrene monomer, 14.0 mass % of ethylbenzene, and 6.5 mass % of high-cis polybutadiene ("BR-15HB" produced by Ube Industries, Ltd.) were dissolved.

<Conditions>
Second Reactor: [Rate of Stirring] 50 rpm, [Reaction Temperature] controlled to give a temperature gradient from 128 to 130° C. in the flow direction,
Fourth Reactor: [Reaction Temperature] controlled to give a temperature gradient from 130 to 145° C. in the flow direction.

(5) Production of Rubber Modified Styrene-Based Resin HIPS-5

A rubber modified styrene-based resin was produced in the same manner as the method of producing HIPS-1 other than using the following liquid material, adding 0.010 mass % of t-butyl cumyl peroxide to the polymerization liquid from the outlet of the second reactor, changing the temperature conditions (rate of stirring and/or reaction temperature) in the second reactor as follows, and adding 0.5 mass % of liquid paraffin to 99.5 mass % of the resin obtained by the polymerization. The properties are shown in Table 1.
<Liquid Material>
The liquid material had 0.025 mass % of t-dodecyl mercaptan added to a solution in which 77.6 mass % of a styrene monomer, 13.7 mass % of ethylbenzene, and 8.7 mass % of high-cis polybutadiene ("BR-15HB" produced by Ube Industries, Ltd.) were dissolved.
<Conditions>
Second Reactor: [Rate of Stirring] 65 rpm, [Reaction Temperature] controlled to give a temperature gradient from 128 to 130° C. in the flow direction.

(6) Production of Rubber Modified Styrene-Based Resin HIPS-6

A rubber modified styrene-based resin was produced in the same manner as the method of producing HIPS-1 other than using the following liquid material, adding 0.010 mass % of t-butyl cumyl peroxide to the polymerization liquid from the outlet of the second reactor, and adding 0.8 mass % of liquid paraffin to 99.2 mass % of the resin obtained by the polymerization. The properties are shown in Table 1.
<Liquid Material>
The liquid material had 0.020 mass % of t-dodecyl mercaptan added to a solution in which 78.4 mass % of a styrene monomer, 13.8 mass % of ethylbenzene, and 7.8 mass % of high-cis polybutadiene ("BR-15HB" produced by Ube Industries, Ltd.) were dissolved.

(7) Production of Rubber Modified Styrene-Based Resin HIPS-7

A rubber modified styrene-based resin was produced in the same manner as the method of producing HIPS-1 other than using the following liquid material, changing the temperature condition (reaction temperature) in the fourth reactor as follows, and adding 1.5 mass % of liquid paraffin to 98.5 mass % of the resin obtained by the polymerization. The properties are shown in Table 1.
<Liquid Material>
The liquid material had 0.020 mass % of t-dodecyl mercaptan added to a solution in which 79.6 mass % of a styrene monomer, 14.1 mass % of ethylbenzene, and 6.3 mass % of high-cis high-vinyl polybutadiene ("MBR 500" produced by Ube Industries, Ltd.) were dissolved.
<Condition>
Fourth Reactor: [Reaction Temperature] controlled to give a temperature gradient from 130 to 148° C. in the flow direction.

(8) Production of Rubber Modified Styrene-Based Resin HIPS-8

A rubber modified styrene-based resin was produced in the same manner as the method of producing HIPS-1 other than using the following liquid material, controlling the conditions (rate of stirring and/or reaction temperature) in the second reactor, the third reactor, and the fourth reactor as follows, and adding 2.0 mass % of liquid paraffin to 98.0 mass % of the resin obtained by the polymerization. The properties are shown in Table 1.

<Liquid Material>

The liquid material had 0.030 mass % of t-dodecyl mercaptan added to a solution in which 78.4 mass % of a styrene monomer, 13.8 mass % of ethylbenzene, and 7.8 mass % of low-cis polybutadiene ("Diene 55AE" produced by Asahi-Kasei Chemicals Corp.) were dissolved.

<Conditions>

Second Reactor: [Rate of Stirring] 70 rpm, [Reaction Temperature] controlled to give a temperature gradient from 128 to 129° C. in the flow direction, Third Reactor: [Rate of Stirring] 30 rpm, [Reaction Temperature] from 130 to 135° C., Fourth Reactor: [Reaction Temperature] controlled to give a temperature gradient from 139 to 165° C. in the flow direction.

(9) Production of Rubber Modified Styrene-Based Resin HIPS-9

A rubber modified styrene-based resin was produced in the same manner as the method of producing HIPS-1 other than using the following liquid material, setting the resin temperature in the first devolatilization chamber of the vacuum devolatilization chambers with a preheater at 220° C., setting the resin temperature in the second devolatilization chamber, and not adding liquid paraffin to the resin obtained by the polymerization. The properties are shown in Table 1.

<Liquid Material>

The liquid material had 0.020 mass % of t-dodecyl mercaptan added to a solution in which 78.6 mass % of a styrene monomer, 13.9 mass % of ethylbenzene, and 7.5 mass % of high-cis polybutadiene ("BR-15HB" produced by Ube Industries, Ltd.) were dissolved.

(10) Production of Rubber Modified Styrene-Based Resin HIPS-10

A rubber modified styrene-based resin was produced in the same manner as the method of producing HIPS-1 other than using the following liquid material, controlling the conditions (rate of stirring and/or reaction temperature) in the third reactor and the fourth reactor as follows, and not adding liquid paraffin to the resin obtained by the polymerization. The properties are shown in Table 1.

<Liquid Material>

The liquid material had 0.035 mass % of t-dodecyl mercaptan added to a solution in which 78.5 mass % of a styrene monomer, 13.9 mass % of ethylbenzene, and 7.6 mass % of high-cis polybutadiene ("BR-15HB" produced by Ube Industries, Ltd.) were dissolved.

<Conditions>

Third Reactor: [Rate of Stirring] 30 rpm, [Reaction Temperature] from 128 to 130° C., Fourth Reactor: [Reaction Temperature] controlled to give a temperature gradient from 140 to 175° C. in the flow direction.

(11) Production of Rubber Modified Styrene-Based Resin HIPS-11

A rubber modified styrene-based resin was produced in the same manner as the method of producing HIPS-1 other than using the following liquid material and adding 3.5 mass % of liquid paraffin to 96.5 mass % of the resin obtained by the polymerization. The properties are shown in Table 1.

<Liquid Material>

The liquid material had 0.020 mass % of t-dodecyl mercaptan added to a solution in which 78.5 mass % of a styrene monomer, 13.9 mass % of ethylbenzene, and 7.6 mass % of high-cis polybutadiene ("BR-15HB" produced by Ube Industries, Ltd.) were dissolved.

(12) Production of Rubber Modified Styrene-Based Resin HIPS-12

A rubber modified styrene-based resin was produced in the same manner as the method of producing HIPS-1 other than using the following liquid material, controlling the conditions (rate of stirring and/or reaction temperature) in the third reactor and the fourth reactor as follows, and not adding liquid paraffin to the resin obtained by the polymerization. The properties are shown in Table 1.

<Liquid Material>

The liquid material had 0.035 mass % of t-dodecyl mercaptan added to a solution in which 79.9 mass % of a styrene monomer, 13.9 mass % of ethylbenzene, and 6.2 mass % of high-cis polybutadiene ("BR-15HB" produced by Ube Industries, Ltd.) were dissolved.

<Conditions>

Third Reactor: [Rate of Stirring] 30 rpm, [Reaction Temperature] from 128 to 130° C., Fourth Reactor: [Reaction Temperature] controlled to give a temperature gradient from 140 to 175° C. in the flow direction.

(13) Production of Rubber Modified Styrene-Based Resin HIPS-13

A rubber modified styrene-based resin was produced in the same manner as the method of producing HIPS-1 other than using the following liquid material and adding 2.0 mass % of liquid paraffin to 96.5 mass % of the resin obtained by the polymerization. The properties are shown in Table 1.

<Liquid Material>

The liquid material had 0.045 mass % of t-dodecyl mercaptan added to a solution in which 78.5 mass % of a styrene monomer, 13.9 mass % of ethylbenzene, and 7.6 mass % of high-cis polybutadiene ("BR-15HB" produced by Ube Industries, Ltd.) were dissolved.

(14) Production of Rubber Modified Styrene-Based Resin HIPS-14

A rubber modified styrene-based resin was produced in the same manner as the method of producing HIPS-1 other than using the following liquid material, continuously feeding the liquid material to the first reactor at a feeding rate of 23 L/hr for polymerization, controlling the conditions (rate of stirring and/or reaction temperature) in the third reactor and the fourth reactor as follows, setting the resin temperature in the first devolatilization chamber of the vacuum devolatilization chambers with a preheater at 200° C., setting the resin temperature in the second devolatilization chamber at 245° C., and adding 2.0 mass % of liquid paraffin to 98.0 mass % of the resin obtained by the polymerization. The properties are shown in Table 1. In the conditions of producing HIPS-14, compared with the conditions of producing HIPS-1, the rate of feeding the liquid material was greater and the amount of the added t-dodecyl mercaptan was also greater and thus Mw in the matrix phase of HIPS-13 was less than that of HIPS-1.

<Conditions>

Third Reactor: [Rate of Stirring] 30 rpm, [Reaction Temperature] from 128 to 130° C., Fourth Reactor: [Reaction Temperature] controlled to give a temperature gradient from 140 to 165° C. in the flow direction.

<Liquid Material>

The liquid material had 0.025 mass % of t-dodecyl mercaptan added to a solution in which 78.6 mass % of a styrene monomer, 13.9 mass % of ethylbenzene, and 7.5 mass % of high-cis polybutadiene ("BR-15HB" produced by Ube Industries, Ltd.) were dissolved.

(15) Production of Rubber Modified Styrene-Based Resin HIPS-15

A rubber modified styrene-based resin was produced in the same manner as the method of producing HIPS-1 other than using the following liquid material, continuously feeding the liquid material to the first reactor at a feeding rate of 23 L/hr for polymerization, adding 0.030 mass % of t-butyl cumyl peroxide to the polymerization liquid from the outlet of the second reactor, controlling the conditions (rate of stirring and/or reaction temperature) in the second reactor and the fourth reactor as follows, setting the resin temperature in the first devolatilization chamber of the vacuum devolatilization chambers with a preheater at 200° C., setting the resin temperature in the second devolatilization chamber at 260° C., and adding 2.0 mass % of liquid paraffin to 98.0 mass % of the resin obtained by the polymerization. The properties are shown in Table 1. In the conditions of producing HIPS-15, compared with the conditions of producing HIPS-1, the amount of added t-dodecyl mercaptan was less. While Mw in the matrix phase was thus a relatively large value, relatively more of low molecular weight components were produced because of the greater feeding rate of the liquid material. As a result, the volume median particle diameter was smaller than that of HIPS-1.

<Conditions>

Second Reactor: [Rate of Stirring] 80 rpm,

Fourth Reactor: [Reaction Temperature] controlled to give a temperature gradient from 137 to 165° C. in the flow direction.

<Liquid Material>

The liquid material had 0.005 mass % of t-dodecyl mercaptan added to a solution in which 78.6 mass % of a styrene monomer, 13.9 mass % of ethylbenzene, and 7.5 mass % of high-cis polybutadiene ("BR-15HB" produced by Ube Industries, Ltd.) were dissolved.

(16) Production of Rubber Modified Styrene-Based Resin HIPS-16

A rubber modified styrene-based resin was produced in the same manner as the method of producing HIPS-1 other than using the following liquid material and not adding liquid paraffin. The properties are shown in Table 1.

<Liquid Material>

The liquid material had 0.020 mass % of t-dodecyl mercaptan added to a solution in which 78.5 mass % of a styrene monomer, 13.9 mass % of ethylbenzene, and 7.6 mass % of high-cis polybutadiene ("BR-15HB" produced by Ube Industries, Ltd.) were dissolved.

(17) Production of Rubber Modified Styrene-Based Resin HIPS-17

A rubber modified styrene-based resin was produced in the same manner as the method of producing HIPS-1 other than using the following liquid material, setting the resin temperature in the first devolatilization chamber of the vacuum devolatilization chambers with a preheater at 220° C., setting the resin temperature in the second devolatilization chamber at 285° C., and adding 2.0 mass % of liquid paraffin to 98.0 mass % of the resin obtained by the polymerization. The properties are shown in Table 1.

<Liquid Material>

The liquid material had 0.020 mass % of t-dodecyl mercaptan added to a solution in which 78.5 mass % of a styrene monomer, 13.9 mass % of ethylbenzene, and 7.6 mass % of high-cis polybutadiene ("BR-15HB" produced by Ube Industries, Ltd.) were dissolved.

(18) Production of Rubber Modified Styrene-Based Resin HIPS-18

A rubber modified styrene-based resin was produced in the same manner as the method of producing HIPS-1 other than using the following liquid material, controlling the conditions (rate of stirring and/or reaction temperature) in the second reactor, the third reactor, and the fourth reactor as follows, adding 0.030 mass % of t-butyl cumyl peroxide to the polymerization liquid from the outlet of the second reactor, and not adding liquid paraffin to the resin obtained by the polymerization. The properties are shown in Table 1.

<Liquid Material>

The liquid material in which 80.9 mass % of a styrene monomer, 14.3 mass % of ethylbenzene, and 4.8 mass % of low-cis polybutadiene ("Diene 55AE" produced by Asahi-Kasei Chemicals Corp.) were dissolved.

First Reactor: [Rate of Stirring] 100 rpm, [Reaction Temperature] 127° C.,

Second Reactor: [Rate of Stirring] 95 rpm, [Reaction Temperature] controlled to give a temperature gradient from 129 to 130° C. in the flow direction, Third Reactor: [Rate of Stirring] 30 rpm, [Reaction Temperature] from 127 to 132° C., Fourth Reactor: [Reaction Temperature] controlled to give a temperature gradient from 132 to 140° C. in the flow direction.

TABLE 1

| | | HIPS-1 | HIPS-2 | HIPS-3 | HIPS-4 | HIPS-5 | HIPS-6 | HIPS-7 | HIPS-8 | HIPS-9 |
|---|---|---|---|---|---|---|---|---|---|---|
| Type of Rubber | — | High-Cis | High-Cis | High-Cis | High-Cis | High-Cis | High-Cis | High-Cis High-Vinyl | Low-Cis | High-Cis |
| Amount of Liquid Paraffin | mass % | 1.5 | 1.4 | 1.9 | 1.4 | 0.5 | 0.8 | 1.5 | 2 | 0 |
| Rubber Content | mass % | 12.1 | 10.4 | 9.1 | 10.3 | 11.7 | 8.9 | 9.5 | 10.6 | 10.3 |
| Gel Component | mass % | 27.6 | 23.6 | 25.1 | 26.1 | 30.3 | 24.7 | 34 | 32.6 | 23.4 |
| Degree of Swelling | — | 15.6 | 15.3 | 13.9 | 14.9 | 13.6 | 13 | 12 | 10.2 | 14 |
| Methanol Soluble Component | mass % | 2.5 | 2.4 | 2.9 | 2.4 | 1.6 | 1.8 | 2.5 | 3 | 1.7 |
| Graft Ratio | — | 1.34 | 1.27 | 1.76 | 1.53 | 1.78 | 1.78 | 2.5 | 2.08 | 1.27 |
| Volume Median Particle Diameter | μm | 4.6 | 5.2 | 4.9 | 4.7 | 4.4 | 4.2 | 4.7 | 5.1 | 4.7 |
| Matrix Molecular Weight | Mn ×$10^4$ | 6.4 | 6.3 | 7.5 | 8.3 | 6 | 6.5 | 7.5 | 7.2 | 5 |
| | Mw ×$10^4$ | 16.7 | 17.1 | 19 | 23 | 15.9 | 17.3 | 18.9 | 15.8 | 16.5 |
| | Mz ×$10^4$ | 30.5 | 31.3 | 34.5 | 39 | 29.9 | 32.7 | 35 | 26.4 | 30.5 |
| | Mw/Mn — | 2.59 | 2.71 | 2.53 | 2.77 | 2.65 | 2.66 | 2.52 | 2.24 | 3.3 |
| | Mz/Mw — | 1.83 | 1.83 | 1.82 | 1.7 | 1.88 | 1.89 | 1.85 | 1.67 | 1.85 |

TABLE 1-continued

|  |  | HIPS10 | HIPS-11 | HIPS-12 | HIPS-13 | HIPS-14 | HIPS-15 | HIPS-16 | HIPS-17 | HIPS-18 |
|---|---|---|---|---|---|---|---|---|---|---|
| Type of Rubber | — | — | High-Cis | High-Cis | High-Cis | High-Cis | High-Cis | High-Cis | High-Cis | High-Cis | Low-Cis |
| Amount of Liquid Paraffin | mass % | 0 | 3.5 | 0 | 2 | 2 | 2 | 0 | 2 | 0 |
| Rubber Content | mass % | 10.3 | 9.8 | 8.4 | 9.7 | 10.3 | 8.9 | 10 | 10.1 | 6 |
| Gel Component | mass % | 23 | 21.9 | 19.3 | 22 | 26.1 | 27.6 | 22.5 | 23.2 | 21.6 |
| Degree of Swelling | — | 15.3 | 15 | 14.3 | 14.3 | 15.9 | 12.5 | 15 | 13.5 | 11.5 |
| Methanol Soluble Component | mass % | 1.2 | 4.5 | 1.8 | 3.2 | 3.2 | 3.5 | 1.2 | 4.1 | 1 |
| Graft Ratio | — | 1.23 | 1.23 | 1.3 | 1.27 | 1.53 | 2.1 | 1.25 | 1.3 | 2.6 |
| Volume Median Particle Diameter | μm | 4.7 | 4.5 | 4.5 | 4.1 | 4.7 | 2.9 | 4.5 | 4.6 | 2.5 |
| Matrix Molecular Weight | Mn | ×10$^4$ | 5.1 | 6 | 5.5 | 4.7 | 5.8 | 6.5 | 5.9 | 4.5 | 7.4 |
|  | Mw | ×10$^4$ | 13.2 | 17.2 | 14 | 12.1 | 14.3 | 17 | 17.2 | 16 | 20.5 |
|  | Mz | ×10$^4$ | 24.1 | 29.7 | 25.2 | 21.8 | 28.1 | 30.9 | 29.5 | 30.2 | 36.5 |
|  | Mw/Mn | — | 2.59 | 2.87 | 2.55 | 2.56 | 2.47 | 2.6 | 2.91 | 3.56 | 2.77 |
|  | Mz/Mw | — | 1.83 | 1.73 | 1.8 | 1.8 | 1.97 | 1.82 | 1.72 | 1.89 | 1.78 |

Examples 1 through 6, 8 through 10, and Comparative Examples 1 through 9

The rubber modified styrene-based resins HIPS-1 through 18 were fed to a sheet extruder having a screw diameter of 40 mm. The temperature in the resin melting zone were set from 180 to 220° C. and the resins were melt extruded from a T die (coat hanger die) at an amount of discharge of 10 kg/h, followed by being pressed on a casting roll and a touch roll that were set at 80° C. to obtain sheets having a width of 40 mm and a thickness of 0.4 mm. The drawdown ratio (die lip thickness/sheet thickness) at this point was 1.5. The properties of the sheets thus obtained are shown in Table 2.

Example 7

The rubber modified styrene-based resin HIPS-6 was fed to a sheet extruder having a screw diameter of 40 mm. The temperature in the resin melting zone was set from 170 to 200° C. and the resin was melt extruded from a T die (coat hanger die) at an amount of discharge of 10 kg/h, followed by being pressed on a casting roll and a touch roll that were set at 40° C. to obtain a sheet having a width of 40 mm and a thickness of 0.4 mm. The drawdown ratio (die lip thickness/sheet thickness) at this point was 1.5. The properties of the sheet thus obtained are shown in Table 2.

Comparative Example 10

Ten mass % of SBR (styrene-butadiene copolymer: Tufprene 125 produced by Asahi-Kasei Chemicals Corp.) was dry blended with 90 mass % of the rubber modified styrene-based resin HIPS-18 to be fed to a sheet extruder having a screw diameter of 40 mm. The temperature in the resin melting zone was set from 180 to 220° C. and the resin was melt extruded from a T die (coat hanger die) at an amount of discharge of 10 kg/h, followed by being pressed on a casting roll and a touch roll that were set at 80° C. to obtain a sheet having a width of 40 mm and a thickness of 0.4 mm. The drawdown ratio (die lip thickness/sheet thickness) at this point was 1.5. The properties of the sheet thus obtained are shown in Table 2.

The various physical properties and performances were evaluated in the methods below.

Resin properties were evaluated by the following methods.

(1) Melt Mass Flow Rate

It was obtained in the conditions of 200° C. and a load of 49 N in accordance with JIS K7210.

(2) Vicat Softening Temperature

It was obtained in the condition of a load of 50 N in accordance with JIS K7206 using a specimen prepared with an injection molding machine.

(3) Charpy Impact Strength

It was obtained in accordance with JIS K7111 using a specimen prepared with an injection molding machine.

Sheet properties were evaluated by the following methods.

(4) Heat Shrinkage Rate

A specimen of 50 mm by 50 mm was cut out of the sheet to be left in in an oven with a rotating specimen rack set at 100° C. for 30 minutes. Then, the specimen taken out of the oven was subjected to measurements of lengths (L1) after shrinkage respectively in an extrusion direction (MD) and a direction (TD) vertical to the extrusion direction in a 0.1 mm unit using vernier calipers to calculate the heat shrinkage rate based on the following equation.

Heat Shrinkage Rate (%)=(50−L1)/50×100

(5) Degree of Gloss

The degrees of gloss on a touch roll surface (surface in contact with the touch roll) and a casting roll surface (surface in contact with a casting roll) were obtained in the condition of an angle of incidence of 60 degrees in accordance with JIS K7105.

(6) Folding Endurance

A specimen of a width 15 mm×a length 110 mm, taking the extrusion direction (MD) as the longitudinal side, was cut out of the sheet to be defined as an MD specimen. In addition, a specimen of a width 15 mm×a length 110 mm, taking the direction (TD) vertical to the extrusion direction as the longitudinal side, was cut out to be defined as a TD specimen. Respectively for the MD specimen and the TD specimen, the number of folding until breaking was obtained in the conditions of a test speed of 175 rpm, a bending angle of 90 degrees, a load of 0.5 kgf, a radius of a bending clamp of 0.38 mm, and an opening of the bending clamp of 1.2 mm using an MIT bending fatigue tester (MIT-DA) manufactured by Toyo Seiki Seisaku-Sho, Ltd.

(7) Tear Strength

In accordance with the Trouser tear method in JIS K7128-1, a specimen of a width 50 mm×a length 150 mm was cut out of the sheet to obtain the tear strength in the conditions of a slit width of 75 mm, a test speed of 200 mm/min, and the tear proceeding in a direction same as the extrusion direction.

(8) Oil Resistance

A strip specimen of a width 15 mm×a length 180 mm, taking the direction (TD) vertical to the extrusion direction as the longitudinal side was cut out of the sheet. As illustrated in FIG. 1, the specimen was mounted in a constant strain jig by bending in an arched shape to the length of 80 mm, and then gauze in the size of 10 mm×20 mm was placed thereon at the center of the specimen and 0.5 mL of vegetable oil (Nisshin Salad Oil, produced by Nisshin OilliO Ltd.). The appearance was visually checked for 24 hours and evaluated as ⊙ for those without cracks, ○ for those without noticeable cracks while whitened, Δ for those with cracks, and × for those broken.

(9) Cracking in Container by Repeated Fitting

The sheet was molded into a coffee cup lid having an outer diameter of φ82 mm, an opening diameter of φ70 mm, and a height of 20 mm using a single shot molding machine. The lid was fit in a paper cup having an opening diameter of 76 mm and fitting and removal was repeated for evaluation as ⊙ for those not cracking even after 1000 times or more of fitting and removal, ○ for those cracking in the range from 1000 to 300 times, Δ for those cracking in the range from 300 to 100 times, and × for those cracking after 100 times or less.

TABLE 2

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin Type | | | HIPS1 | HIPS2 | HIPS3 | HIPS4 | HIPS5 | HIPS6 | HIPS6 | HIPS7 | HIPS8 | HIPS9 |
| Resin Properties | Melt Mass Flow Rate | g/10 min | 3.3 | 3.4 | 3.5 | 1.9 | 3.4 | 3 | 3 | 3.2 | 3.7 | 3 |
| | Vicat Softening Temperature | °C. | 88 | 89 | 89 | 90 | 89 | 93 | 93 | 89 | 88 | 89 |
| | Charpy Impact Strength | kJ/m$^2$ | 19 | 19 | 18 | 20 | 16 | 16 | 16 | 16 | 12 | 17 |
| Sheet Properties (100°C. × 30 min) | Heat Shrinkage Rate | MD % | 2.1 | 0.6 | 1.8 | 2.5 | 1.5 | 0.3 | 6 | 1.5 | 1.5 | 0.6 |
| | | TD % | 0.1 | 0 | 0.2 | 0.1 | 0 | 0 | 1.2 | 0.2 | 0 | 0 |
| | | MD + TD % | 2.2 | 0.6 | 2 | 2.6 | 1.5 | 0.3 | 7.2 | 1.7 | 1.5 | 0.6 |
| | Degree of Gloss | Touch Roll Surface % | 6 | 6.4 | 6.6 | 4.9 | 4 | 8.4 | 62 | 6.5 | 4 | 6 |
| | | Casting Roll Surface % | 33 | 25 | 23.1 | 23.1 | 25 | 21.9 | 72.4 | 25 | 25 | 25 |
| | Folding Endurance | MD times | 150 | 180 | 170 | 180 | 120 | 50 | 45 | 180 | 35 | 100 |
| | | TD times | >5000 | 1750 | 1750 | 1850 | 1050 | 950 | 800 | 1850 | 550 | 1050 |
| | Tear Strength | N/mm | 4.5 | 4.6 | 4.5 | 4.8 | 3.8 | 3.7 | 3.2 | 4.5 | 3 | 3.7 |
| | Oil Resistance | — | ⊙ | ⊙ | ⊙ | ⊙ | ⊙ | ⊙ | ⊙ | ⊙ | ○ | ⊙ |
| | Cracking in Container by Repeated Fitting | — | ⊙ | ⊙ | ⊙ | ⊙ | ○ | ○ | ○ | ⊙ | ○ | ○ |

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin Type | | | HIPS10 | HIPS11 | HIPS12 | HIPS13 | HIPS14 | HIPS15 | HIPS16 | HIPS17 | HIPS18 | HIPS18/SBR |
| Resin Properties | Melt Mass Flow Rate | g/10 min | 5 | 5.8 | 4.1 | 5.9 | 5 | 3.9 | 4.3 | 5 | 2.7 | 4.2 |
| | Vicat Softening Temperature | °C. | 88 | 86 | 94 | 87 | 87 | 91 | 88 | 87 | 94 | 88 |
| | Charpy Impact Strength | kJ/m$^2$ | 14 | 13 | 13 | 13 | 16 | 15 | 13 | 15 | 11 | 15 |
| Sheet Properties (100°C. × 30 min) | Heat Shrinkage Rate | MD % | 1.5 | 2 | 2.3 | 2.1 | 1.7 | 2.3 | 2 | 2 | 1.5 | 2.1 |
| | | TD % | 0.2 | 0.1 | 0.3 | 0.3 | 0.2 | 0.2 | 0.1 | 0.3 | 0.3 | 0.3 |
| | | MD + TD % | 1.7 | 2.1 | 2.6 | 2.4 | 1.9 | 2.5 | 2.1 | 2.3 | 1.8 | 2.4 |
| | Degree of Gloss | Touch Roll Surface % | 5.2 | 4.9 | 5.1 | 5 | 5 | 17.2 | 5 | 4.8 | 26.3 | 30.5 |
| | | Casting Roll Surface % | 31.4 | 24.5 | 37.8 | 36.3 | 30.2 | 45.3 | 25 | 24 | 58 | 71.2 |
| | Folding Endurance | MD times | 5 | 15 | 1 | 1 | 25 | 32 | 10 | 95 | 1 | 200 |
| | | TD times | 18 | 70 | 15 | 13 | 65 | 70 | 65 | 125 | 2 | 350 |
| | Tear Strength | N/mm | 2 | 2.1 | 2 | 1.9 | 2.1 | 2.2 | 2 | 2.5 | 0.5 | 2.5 |
| | Oil Resistance | — | Δ | Δ | X | X | Δ | X | Δ | Δ | X | X |
| | Cracking in Container by Repeated Fitting | — | X | X | X | X | Δ | Δ | X | Δ | X | Δ |

The sheets prepared from the rubber modified styrene-based resins of Examples 1 through 10 had the oil resistance, the folding endurance, and the tear strength significantly improved compared with Comparative Examples 1 through 9. The container lids obtained by thermoforming of the sheets cracked less even by repeated fitting. They were also excellent in oil resistance compared with the sheet of Comparative Example 10 in which SBR was added.

In Comparative Example 1, since the methanol soluble component was too little and also Mw in the matrix phase was too small, the tear strength and the oil resistance were low and the lid was prone to crack during the fitting.

In Comparative Example 2, since the gel component was too little and also the methanol soluble component was too much, the tear strength and the oil resistance were low and the lid was prone to crack during the fitting.

In Comparative Example 3, since the gel component was too little and also Mw in the matrix phase was too small, the tear strength and the oil resistance were low and the lid was prone to crack during the fitting.

In Comparative Examples 4 and 5, since Mw in the matrix phase was too small, the tear strength and the oil resistance were too low and the lid was prone to crack during the fitting.

In Comparative Example 6, since the volume median particle diameter of the rubbery dispersed particles was too small, the tear strength and the oil resistance were low and the lid was prone to crack during the fitting.

In Comparative Example 7, since the methanol soluble component was too little, the tear strength and the oil resistance were low and the lid was prone to crack during the fitting.

In Comparative Example 8, since the methanol soluble component was too much, the tear strength and the oil resistance were low and the lid was prone to crack during the fitting.

In Comparative Example 9, since the methanol soluble component was too little and also the volume median particle diameter of the rubbery dispersed particles was too small, the tear strength and the oil resistance were low and the lid was prone to crack during the fitting.

From the above results, it was found that the tear strength and the oil resistance were high and cracks during the fitting did not easily occur only when all of the volume median particle diameter of the rubbery dispersed particles, the gel component, Mw in the matrix phase, and the methanol soluble component were within the specific ranges.

INDUSTRIAL APPLICABILITY

The rubber modified styrene-based resin of the present invention is excellent in oil resistance, folding endurance, and tear strength and thus widely applicable as a food container and a food container lid member that make contact directly with oil and milk and are repeatedly fit.

The invention claimed is:

1. A rubber modified styrene-based resin comprising:
   rubbery dispersed particles, having a volume median particle diameter from 4.2 µm to 8 µm and a gel component from 23.4 mass % to 34.0 mass %;
   a matrix phase having a weight average molecular weight (Mw) from 158 thousand to 280 thousand; and
   a methanol soluble component from 1.6 mass % to 4.0 mass %.

2. A method of producing the rubber modified styrene-based resin according to claim 1 comprising graft polymerizing a styrene-based monomer in presence of high-cis polybutadiene having a 1,4-cis structure of 90 mol % or more and having a 1,2-vinyl structure of 4 mol % or less and/or high-cis high-vinyl polybutadiene having a 1,4-cis structure from 65 to 95 mol % and having a 1,2-vinyl structure from 30 to 4 mol %.

3. A sheet comprising the rubber modified styrene-based resin according to claim 1.

4. The sheet according to claim 3, wherein a sum of heat shrinkage rates at 100° C. for 30 minutes in an extrusion direction of the sheet and a direction vertical thereto is 10% or less.

5. The sheet according to claim 3, wherein a degree of gloss of at least one surface of the sheet at an angle of incidence of 60 degrees is 70% or less.

6. A food container comprising the sheet according claim 3, the container obtained by thermoforming the sheet.

7. A food container lid member comprising the sheet according to claim 3, the food container lid obtained by thermoforming the sheet.

8. The resin of claim 1, wherein the volume median particle diameter is between 4.5 µm and 8 µm.

9. The resin of claim 1, wherein the methanol soluble component is between 1.6 mass % and 3.0 mass %.

10. The resin of claim 1, wherein the methanol soluble component is between 2.0 mass % and 4.0 mass %.

11. The resin of claim 1, wherein the Mw of the matrix phase is between 158 thousand and 250 thousand.

12. The resin of claim 1, wherein the Mw of the matrix phase is between 160 thousand and 280 thousand.

* * * * *

UNITED STATES PATENT AND TRADEMARK OFFICE
CERTIFICATE OF CORRECTION

PATENT NO.         : 9,944,785 B2
APPLICATION NO.    : 15/036541
DATED              : April 17, 2018
INVENTOR(S)        : H. Yamaguchi et al.

Page 1 of 1

It is certified that error appears in the above-identified patent and that said Letters Patent is hereby corrected as shown below:

| Column | Line(s) | Error |
|---|---|---|
| 20 | 33 | "comprising the sheet according Claim 3," should read |
| (Claim 6, Lines 1-2) | | --comprising the sheet according to Claim 3,-- |

Signed and Sealed this
Twenty-eighth Day of August, 2018

Andrei Iancu
*Director of the United States Patent and Trademark Office*